United States Patent
Hickman

[15] 3,642,302
[45] Feb. 15, 1972

[54] COMPRESSION RUBBER VEHICLE SUSPENSION

[72] Inventor: Albert F. Hickman, 8009 Gowanda State Road, Eden, N.Y. 14057

[22] Filed: Feb. 26, 1970

[21] Appl. No.: 14,402

Related U.S. Application Data

[63] Continuation-in-part of Ser. No. 634,561, Apr. 28, 1967, Pat. No. 3,511,332.

[52] U.S. Cl. ................................280/124, 267/21, 267/63
[51] Int. Cl. ..........................................................B60g 3/14
[58] Field of Search................180/73 TL, 72; 267/21, 18, 267/30, 63; 280/124

[56] References Cited

UNITED STATES PATENTS

| | | |
|---|---|---|
| 3,175,637 | 3/1965 | Honda.....................................180/72 |
| 3,410,573 | 11/1968 | Hickman..............................267/63 X |

FOREIGN PATENTS OR APPLICATIONS 806,516    9/1936    France......................................180/72

Primary Examiner—A. Harry Levy
Attorney—Harold I. Popp

[57] ABSTRACT

With a vehicle frame connected to each supporting wheel by an arm extending lengthwise of the vehicle travel and connected to the wheel by a stub axle and to the frame by a bearinged hub parallel with the wheel axis, substantially the entire resilient frame support is provided by a pair of compression rubber bodies separated by a guide and acting in tandem between the arm and frame. The guide is guided to move along a line of force passing centrally through the bodies which expand and contract transversely of the line of force to provide such resilient support. The guide is preferably the free end of a metal spring leaf attached at its other end to the arm between its stub axle and hub.

7 Claims, 5 Drawing Figures

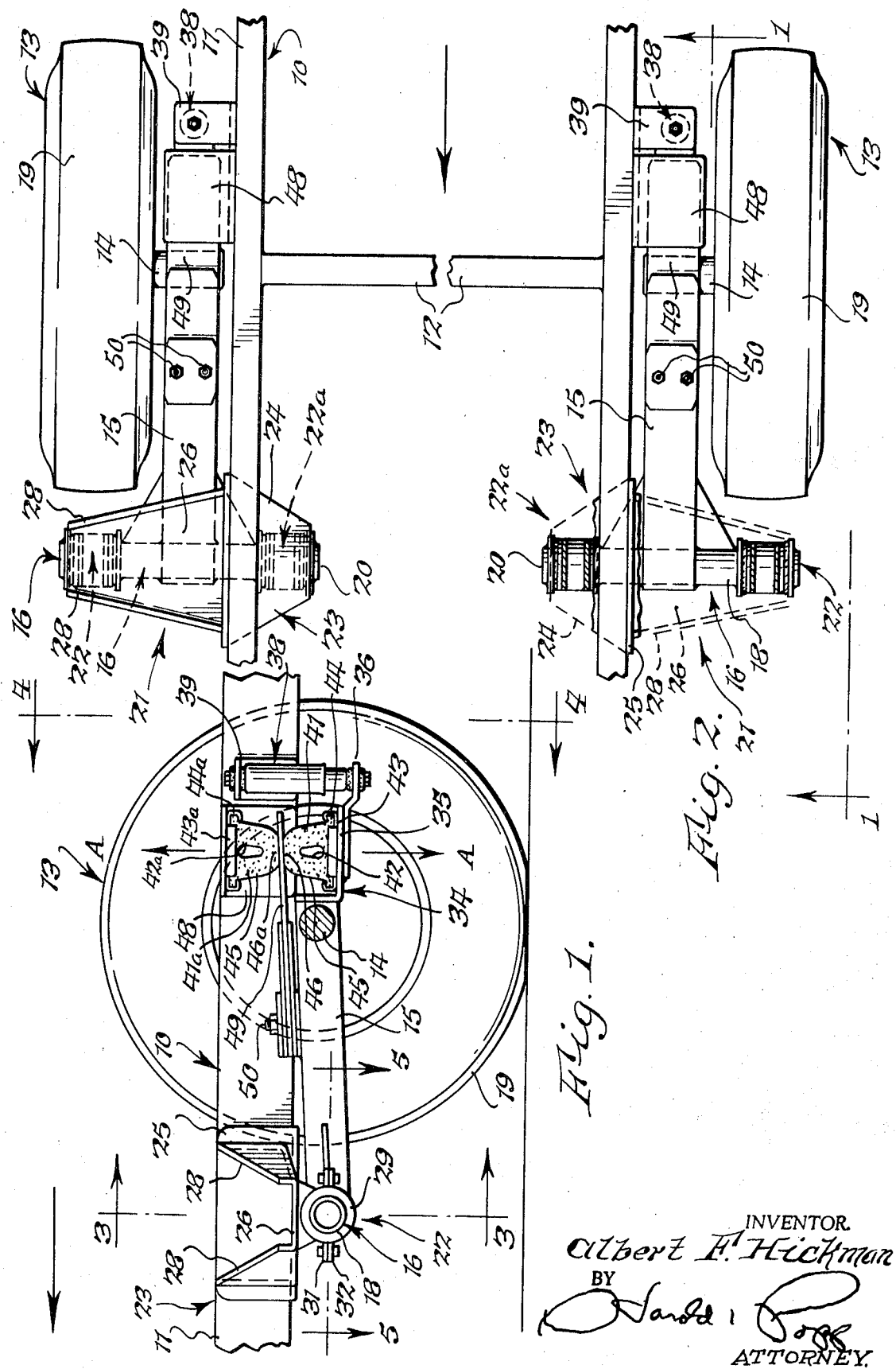

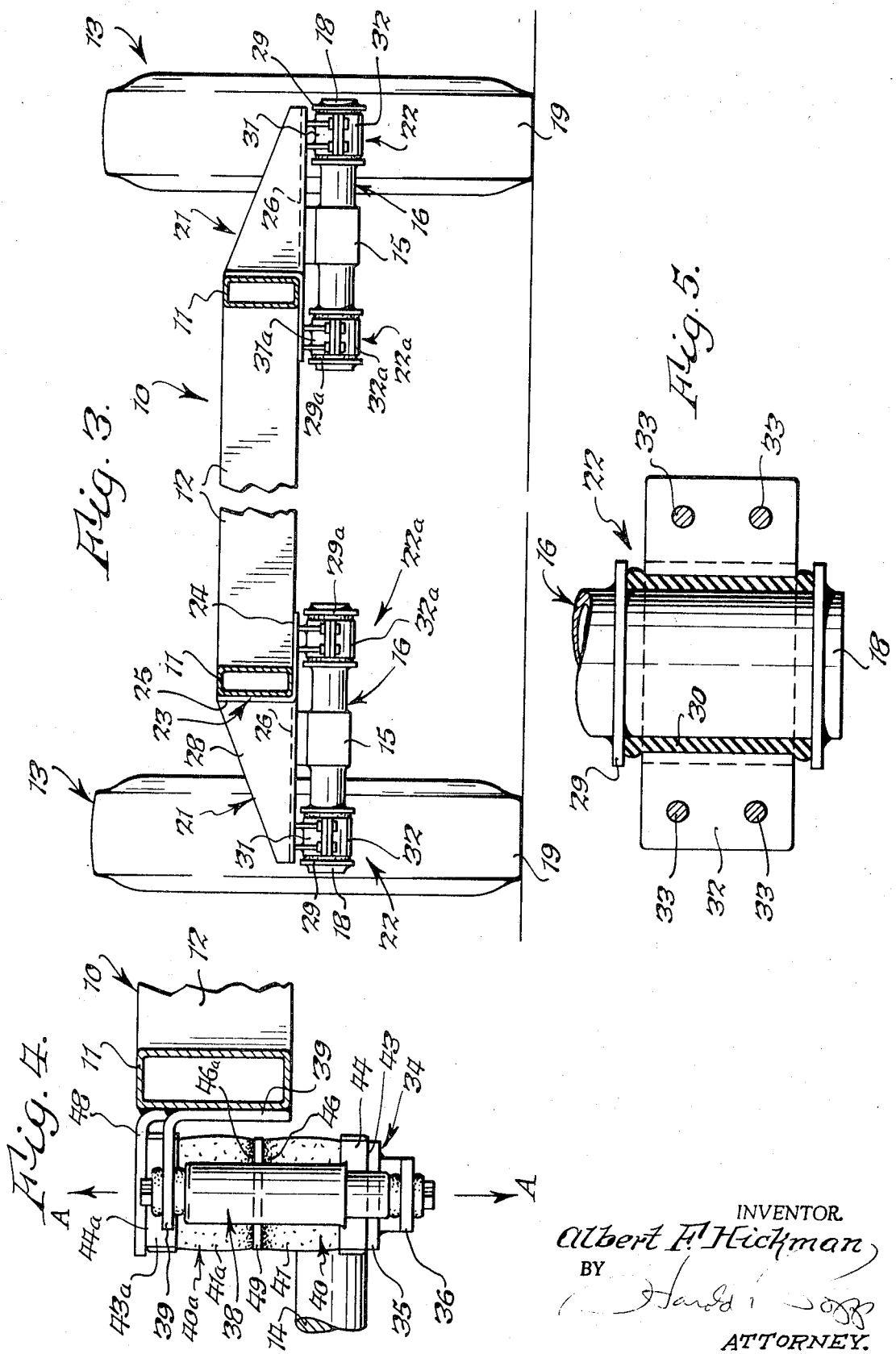

COMPRESSION RUBBER VEHICLE SUSPENSION

This application is a continuation-in-part of my copending application Ser. No. 634,561 filed Apr. 28, 1967 for Compression Rubber Spring Suspension, now U.S. Pat. No. 3,511,332.

In common with my said application general objects of the present invention are to provide such a suspension which is substantially friction-free but produces resistance to motion in direct proportion to the amplitude and velocity of vertical main frame movement; which consists of compact components which are arranged so as not to interfere with frame and wheel movement; and which provides wide and high effective spring centers for control of sidesway.

An important specific object is to provide a suspension of the above-described class in which the resilience is provided by a pair of compression rubber bodies acting in tandem to provide double allowable spring deflection with minimum load upon the frame bearings for the hub.

Another specific object is to provide a simple and effective guide for the opposing portions of the pair of compression rubber spring bodies.

Another specific object is to provide such a suspension made of components which are interchangeable so as to greatly reduce manufacturing cost through mass production of a plurality of identical components and also to reduce inventory requirements in the field for wrecked vehicles.

Another specific object is to provide such a suspension which is extremely simple and low in cost.

In the drawings

FIG. 1 is a fragmentary side elevational view of the vehicle frame in its empty body position and supported at each side by a spring suspension embodying the present invention, parts being omitted for the purpose of clarity, and this view being taken on line 1—1, FIG. 2 is a fragmentary top plan view of the frame and spring suspensions shown in FIG. 1. In these two figures the direction of forward movement of the vehicle is shown by a large arrow.

FIG. 3 is a vertical transverse section taken generally on line 3—3, FIG. 1.

FIG. 4 is an enlarged fragmentary section taken generally on line 4—4, FIG. 1.

FIG. 5 is an enlarged fragmentary horizontal section taken on line 5—5, FIG. 1.

The vehicle frame 10 can be of any suitable construction and is shown as comprising a pair of main longitudinal side frame bars 11 of rectangular box form which are shown as straight and parallel and connected by crossbars, one of which is indicated at 12.

The frame 10 is shown as supported by rubber-tired wheels 13 each journaled on a stub axle 14 in any suitable manner (not shown), these stub axles extending horizontally transversely of the line of travel of the vehicle and the stub axles at opposite sides of the vehicle being normally arranged in line with each other as best shown in FIG. 2.

Each stub axle is welded or fixed to the outboard end of an arm 15 which can be of any suitable form, but if shown as being straight and of rectangular tubular or box form with the stub axle extending through its sidewalls and welded thereto.

The inboard end of each arm 15 embraces and is welded to the central body portion of a tubular hub member 16 which is arranged generally parallel with the axis of its stub axle 14. Each arm 15 is preferably welded to the center of its tubular hub 16 and is straight and perpendicular thereto so that these assemblies at opposite sides of the vehicle can be identical. Each tubular hub 16 has an outboard end 18 projecting to a position of alignment with at least a portion of the tread 19 of its wheel 13 to provide high and wide effective spring centers for the vehicle. Each hub 16 has an inboard end 20 projecting under the corresponding main longitudinal side frame bar 11 as best shown in FIG. 3.

Each tubular hub member 16 supports a frame bracket 21 through rubber-bushed outboard and inboard bearings 22, 22a, respectively. Each frame bracket can be of any suitable construction but is shown as comprising a body part 23 which is L-shaped in cross section, having a bottom horizontal part 24 which underlays the corresponding main longitudinal side frame bar 11 and an upright side part 25 extending along the outside vertical face of the frame bar. This body part can be secured to its frame bar 11 in any suitable manner and a U-shaped bracket having a bottom cross plate 26 and rising sidewalls 28 projects outwardly from the frame, and is welded to the side part 25.

Each outboard bearing 22 is fixed to the underside of this bottom cross plate 26 and is inboard bearing 22a to the bottom part 23 of the same frame bracket 21 and since these bearings are identical only the outboard bearing will be described, this description applying to the parts of the inboard bearing 22a which are distinguished by the suffix "a." Thus each bearing 22 includes a pair of rings 29 encircling the outboard end 18 of each hub member 16 and welded thereto in spaced relation to each other as best shown in FIG. 5. A resilient rubber bushing embraces this outboard end and is confined between the pair of rings 29. An upper half-bearing housing 31 overlays the rubber bushing 30 and is welded to the underside of the bottom cross plate 26 of the frame bracket 21. A lower half-bearing housing 32 embraces the lower half of this rubber bushing, and bolts 33 connect these half-bearing housings 31, 32 and serve to draw the rubber bushing 30 into compressive relation with them and to the corresponding end 18 of the hub 16.

A U-shaped bracket 34 is welded to and forms an extension of the end of each arm 15 remote from its hub 16. This bracket forms a generally horizontal extension 35, to the underside of which is fixed an extension 36 secured to one end of an upright telescopic shock absorber 38. The other end of this shock absorber 38 is suitably secured to a frame bracket 39. Preferably each shock absorber is single acting, offering no substantial resistance to the upward movement of its wheel 13 but serving to retard its rebound movement.

The resilient support for the frame 10 on each wheel 13 is provided substantially exclusively by a pair of compression rubber springs 40, 40a, which act jointly in tandem to provide such support and resilient resistance to movement of the frame relative to the wheels. These compression rubber springs are preferably of equal value and are formed in the manner set forth in detail in my copending application, Ser. No. 732,799, filed May 7, 1965 now U.S. Pat. No. 3,542,353, for Compression Rubber Spring to which reference is made for a more detailed description. For brevity only, the compression rubber spring 40 will be briefly described herein, the same applying to the companion compression rubber spring 40a, the corresponding parts of which are distinguished by the suffix "a."

Each compression rubber spring 40 has a rubber body 41 generally in the form of a loaf of bread with a hole 42 extending therethrough parallel with a flat rectangular face attached to a mounting plate 43 as by C-shaped flanges 44 of the mounting plate embracing side flanges along the edges of the rubber body forming this flat rectangular face. The hole 42 forms thick sidewalls 45 connected by a thick arch 46 opposite from the attaching plate 43. This attaching or mounting plate of the corresponding compression rubber spring 40 is fixed in any suitable manner to the top face of the extension 35 of the bracket 34 and the mounting plate 43a of the compression rubber spring 40a is secured to the underside of an L-shaped frame bracket 40 so that the exterior faces of the arched portions 46, 46a of each companion pair of rubber bodies are in opposition to each other along a line of force A. These opposing exterior faces of the arched portions 46, 46a of each pair of compression rubber springs have full time, nonadhering, touching contact with a horizontally elongated metal guide member 49 which serves to hold these full time, nonadhering, touching faces of the arched portions 46, 46a to both move generally along the line of force A.

Each guide member 49 is supported so as to be movable generally along this generally vertical line of force A, but is restrained against excessive horizontal movement, and for simplicity this guide member 49 is the center metal leaf of a generally flat leaf spring, the bundle of leaves of which is secured, as by bolts 50, to the top of the corresponding arm 15 between its stub axle 14 and hub 16.

OPERATION

Upward movement of each wheel 13, through its stub axle 14, raises the rear end of its arm 15 which fulcrums in the rubber-bushed outboard and inboard bearings 22, 22a connecting the hub 16 of this arm to the frame 10. This upward movement of the rear or stub axle end of the arm 15, through the L-shaped bracket 34, compresses the rubber body 41 of the lower compression rubber spring 40 upward along the line of force A against the metal spring leaf 49 fixed to the arm 15, the top face of the arched part 46 having full time, nonadhering, touching contact only with this leaf. This leaf yields upwardly against the bottom face of the top compression rubber spring 40a, there again being full time, nonadhering, touching contact only between this bottom face and the metal spring leaf 49. The top compression rubber spring 40a is compressed in tandem with the bottom rubber spring 40 due to the mounting of the upper compression rubber spring 40a against the underside of the frame bracket 48 and through which the upward force of the wheel is transmitted, through the two compression rubber bodies, in tandem to the frame 10.

Rebound forces are checked by the shock absorber 38. The compression rubber springs act as substantially constant rate springs throughout the empty vehicle, static load, and dynamic shock ranges of action. To this end it is necessary that the lower rubber body 41 have its bottom face secured, via the plate 43, to the arm 15 and have full-time, nonadhering or touching contact only with the guide spring leaf 49. Similarly, it is necessary that the upper rubber body have its top face secured, via the plate 43a, to the frame bracket 48 and have full time, nonadhering or touching contact only with the guide leaf spring 49.

It is also essential that the rubber bodies 41, 41a have nontipping broad support on their mounting plates, 43, 43a and that bond stresses do not develop between these rubber bodies and their plates. Also the legs 45, 45a must be horizontally thick enough, as viewed in FIG. 1, to be acted upon substantially exclusively in compression, these legs thickening horizontally to provide the required resilience.

The leaf spring 49 forms a simple guide for holding the compression rubber spring bodies 41, 41a in line with their line of force A especially with full-time, nonadhering contact with this guide spring leaf.

As in the preceding description, in the following claims "wheel" is intended to include the ground-engaging means 13 supporting each stub axle 14 regardless of whether in the form of a single wheel or in the form of a dual-tired wheel (not shown) and also the term "rubber" is intended to include natural or synthetic resilient rubber or mixtures of both.

I claim:

1. A spring suspension adapted to be interposed between each side of a vehicle frame structure and a single rubber-tired supporting wheel assembly having a road-engaging tread, the suspension including an arm structure between each wheel assembly and the center of said frame structure and extending lengthwise of the line of vehicle travel, a stub axle connecting one end of said arm structure with said wheel assembly, means pivotally connecting the other end of said arm structure to said frame structure for oscillation about an axis parallel with said stub axle, a seat member having an upwardly facing seat and attached to said arm structure, and a frame bracket member above and in the path of said seat member, wherein the improvement comprises a pair of flexible rubber compression bodies providing substantially the entire resilient support for said frame structure on said wheel assembly and interposed in tandem between said seat member and frame bracket member and acted on thereby along a line of force extending centrally through said rubber bodies with said rubber bodies expanding and contracting transversely of said line of force to provide resilient support for said frame structure on said wheel assembly, a horizontally elongated metal guide member having one end operatively contacting and interposed between said rubber bodies, said one end of said guide member being movable generally along said line of force, and said horizontally elongated guide member projecting from its said one end generally toward said axis, and means connecting the other end of said horizontally elongated guide member to one of said structures.

2. A spring suspension as set forth in claim 1 wherein the effective length of said horizontally elongated metal guide member is substantially less than the effective length of said arm structure.

3. A spring suspension as set forth in claim 1 wherein one of said rubber bodies is fixed to said seat member, the other of said rubber bodies is fixed to said bracket member, and both of said rubber bodies have full time nonadhering touching contact with opposite sides of said horizontally elongated metal guide member.

4. A spring suspension as set forth in claim 1 wherein said horizontally elongated metal guide member is in the form of the free end of a metal spring leaf, and said connecting means comprises means fixing it other end to one of said structures.

5. A spring suspension as set forth in claim 1 wherein said horizontally elongated metal guide member is in the form of the free end of a metal spring leaf and said connecting means comprises means fixing its other end to said arm structure between its stub axle and said means pivotally connecting said arm structure to said frame structure.

6. A spring suspension as set forth in claim 5 wherein said seat member is positioned at the side of said stub axle remote from said means pivotally connecting said arm structure to said frame structure.

7. A spring suspension as set forth in claim 1 including a longitudinal extension for said arm structure on the side of said stub axle remote from said means pivotally connecting said arm structure to said frame structure, and an upright telescopic shock absorber pivotally connecting said longitudinal extension with said frame structure.

* * * * *